United States Patent Office 3,718,483
Patented Feb. 27, 1973

3,718,483
METHOD FOR PREPARING STORAGE-STABLE BAKERY PRODUCTS WITHIN HERMETICALLY SEALED CONTAINERS
James W. Davis, Winston-Salem, N.C., and Anthony P. Umina, Hopkinton, and Nancy J. Kelley, Natick, Mass., assignors to the United States of America as represented by the Secretary of the Army
No Drawing. Filed Nov. 18, 1970, Ser. No. 90,796
Int. Cl. A21d 8/06
U.S. Cl. 99—182
6 Claims

ABSTRACT OF THE DISCLOSURE

Storage-stable bread and cake products are produced within rigid, hermetically sealed containers by partially filling a metal can with a batter or dough mixture that is characterized by having a moisture content substantially less than that of a normal batter or dough and having ¼ to ⅔ the normal amount of chemical leavening agent, hermetically sealing the can under a vacuum of from 10 to 30 inches of mercury and cooking the contents within the sealed container.

The invention described herein may be manufactured, used and licensed by or for the Government for governmental purposes without the payment to us of any royalty thereon.

BACKGROUND OF THE INVENTION

This invention relates broadly to packaged bakery products and, more particularly, to a method whereby bread and cake products are cooked within hermetically sealed, rigid, containers.

All attempts, heretofore, to produce shelf-stable, bakery products within hermetically sealed containers have been unsuccessful. If such products are to retain their characteristic and recognizable organoleptic properties they cannot, of course, be subjected to thermal sterilization since such high temperature treatment overcooks the product and alters the flavor. It is desirable, in any event, that such products be produced under conditions which will reduce the likelihood of microbial contamination. Canned bakery products have been formed, heretofore, by inserting a quantity of the standard batter or dough material within a cylindrical metal container, crimping the top cover on the container, baking the batter and then completely sealing the container. It is necessary that the container be unsealed during cooking to allow moisture to escape and to allow for expansion and rising of the contents. However, if the container is to be sealed after the cooking operation, there exists the possibility of recontaminating the contents. Furthermore, experience has shown that the actual amount of moisture that escapes from such partially sealed containers during cooking varies significantly, with the result that the finished product is not at all uniform in moisture content. Sealing the container prior to cooking would be even more unsatisfactory since there would be developed within the container a great deal of internal pressure due to the generation of steam and carbon dioxide gases, the contents would tend to bubble and the resulting product would be quite rubbery indicating that the starches have become overcooked. It is obvious that there is presently a need for a process of producing a stable cake or bread bakery product within an hermetically sealed container that is uniform with respect to moisture content, has the characteristic texture and flavor of the product, and has not been exposed to any contamination following baking.

SUMMARY

A storage-stable, cake or bread bakery product, hermetically sealed within a rigid container, is obtained by inserting a quantity of a low-moisture and low-chemical leavening batter within the container, partially filling the container, sealing the container under vacuum and cooking the contents within the sealed container.

DESCRIPTION OF THE PREFERRED EMBODIMENTS

The production of storage-stable, bakery products within rigid, hermetically sealed containers, according to the present invention requires changes to the composition of the batter or dough normally employed for the desired end product and, in addition, requires that a vacuum be drawn on the container and its contents prior to sealing. The expression "storage-stable" when used herein refers to products which may be stored in their container without refrigeration, at ambient temperatures for extended periods of time without any significant loss of quality, or development of any toxic products. "Bakery products," for purposes of this invention, refers to chemically leavened cakes and chemically leavened bread products and "batter" can mean so-called cake batter or bread dough. The containers within which the product is cooked and then stored until consumption are rigid containers well known in the art, e.g. metal cans, which may be hermetically sealed. The containers must have sufficient rigidity to withstand the external pressure resulting from the vacuum within the sealed container.

The following examples describe the production of products according to the present invention:

Example I

A batter mix suitable for use as base for any number of different cake recipes contains the following ingredients with the amounts of each ingredient in the mixture being expressed as percent by weight of the total mixture.

|   | Percent |
| --- | --- |
| Salt | 0.874 |
| Flour | 28.00 |
| Whole eggs | 14.00 |
| Sugar | 41.60 |
| Shortening | 14.65 |
| Baking powder | 0.876 |
|   | 100.000 |

This basic batter mix is added to other optional ingredients to produce the desired type of cake. In this example a pound cake is produced with the following ingredients:

|   | Percent by weight |
| --- | --- |
| Batter mix | 95.6 |
| Water | 4.34 |
| Lemon oil | 0.06 |
|   | 100.00 |

In preparing the pound cake batter, the dry ingredients are first blended together. Shortening is added to and thoroughly blended with the dry ingredients. Eggs, water and liquid flavoring are beaten together and then combined with the shortening-dry ingredient mixture and mixed at high speed until completely blended. The moisture content of the batter is 12% by weight and the baking powder content is 0.83% by weight.

Sufficient batter is placed within an open typestyle, round, metal can with soldered side seam and compound-lined, double-seamed ends to half fill the can. The can and its contents are placed within a vacuum sealer and a vacuum about 15 to 20 inches of mercury (atmospheric pressure 29.9 inches) is drawn on the can, and the can is then hermetically sealed. The product is then baked at a temperature of about 300° F. until completely cooked. The time for cooking and the temperature will vary with the quantity of the batter within the container. For 4 oz. of batter in a 300 x 200 container, the cooking time is approximately 70 minutes at 300° F. After cooking, the product was removed from the container and bisected vertically with a sharp knife and evaluated for taste, flavor and appearance. The moisture content, texture, and flavor of the product was found to be that of a typical pound cake and the product was free of any soggy or doughy areas. The same pound cake after storage for 3 months at 100° F. when examined was found to be virtually unchanged from the freshly baked product and contained no racid or stale flavors or odors and was free from any mold growth. The moisture content of the pound cake was 12% by weight.

Example II

A chocolate nut cake was prepared utilizing the following ingredients:

|  | Percent by weight |
| --- | --- |
| Batter mix (from Example I) | 67.0 |
| Pecan pieces | 14.2 |
| Semi-sweet chocolate drops | 14.2 |
| Imitation vanilla | 0.24 |
| Water | 4.36 |
|  | 100.00 |

The procedure for blending, filling, vacuum sealing and cooking disclosed in Example I was followed. The moisture content of the batter was 10.5% by weight. The vacuum drawn on the can was 25 inches of mercury. The cooked product when removed from its container did not crumble or have any soggy or gummy portions, and was free from off-odors or off-flavors. After cooking and cooling, the vacuum within the container was 14 inches of mercury. Three months storage at 100° F. failed to produce any mold growth or significant change in the organoleptic properties of the product.

Example III

A spice cake was prepared using the following ingredients:

|  | Percent by weight |
| --- | --- |
| Batter mix | 63.4 |
| Rolled oats | 12.8 |
| Raisins | 9.85 |
| Imitation vanilla | 0.142 |
| Water | 3.59 |
| Cinnamon | 0.186 |
| Cloves | 0.142 |
| Nutmeg | 0.090 |
| Brown sugar | 9.8 |
|  | 100.00 |

The ingredients are blended and mixed together as in Example I. The moisture content of the batter is 14% by weight. A fluted paper cup, which covers the bottom and sides of the metal can, is placed within a 300 x 200 can and 4¼ ounces of batter are placed within the cup. A vacuum of 20 inches of mercury is drawn on the can and the can hermetically sealed. The optimum sealing vacuum may be varied by changing the leavening level. In general, leavening should be low and vacuum high to maintain a vacuum in the cooled can. The sealed cans are retorted for 45 minutes at a temperature of 250° F. and then watercooled to a temperature of 150° F. The finished product when removed from the can and cut into sections did not crumble, was free of soggy or doughy areas, had moisture, texture and flavor properties of a conventionally prepared spice cake. After six months storage at ambient temperatures, the product was virtually indistinguishable from the freshly cooked product and was devoid of any signs of mold growth.

Example IV

A cooked-in-can bread product was prepared with the following ingredients:

| High protein flour | g | 250 |
| --- | --- | --- |
| Shortening | g | 22 |
| Sugar | g | 22 |
| Sodium aluminum phosphate | g | 3.5 |
| Soda | g | 3.3 |
| Sodium stearyl fumarate | g | 5 |
| Calcium peroxide | g | 5 |
| Water | ml | 170 |

The dry materials were blended together and then blended with the shortening. Water was added and the mixture blended at moderate speed for 10 minutes. 2½ oz. portions of the bread dough were inserted in 300 x 200 metal cans, subjected to a vacuum of 30 inches of mercury and hermetically sealed. The sealed cans were retorted at 250° F. for 45 minutes and then watercooled to less than 125° F. After cooling, several cans were opened and the bread examined. The bread was found to have substantially uniform texture throughout and to be free of soggy, or doughy areas. The flavor was characteristic of a chemically-leavened bread. Similar samples stored for 3 months at 100° F. were found to have substantially similar properties to the freshly baked item and were free from any signs of mold growth.

In the practice of the present invention, to obtain cooked-in-the-can bakery products, it has been found to be essential that the total moisture content of the batter or dough before the container is sealed be within the range of 10% to 20% by weight for cakes and about 35% for bread based upon the total weight of the composition. The moisture content of cake batters is normally about 35% and for bread dough is normally about 47% by weight. It is, of course, obvious that the moisture content of the batter or dough will equal the moisture content of the baked product since cooking takes place within the sealed container and, therefore, one should not have a moisture level too high to be acceptable. Cake products having a moisture content well in excess of 20% by weight are quite acceptable. We have discovered, however, that in cooking within a sealed container when the moisture level is in excess of 20% by weight, there results a product which is quite rubbery in texture which is due to an overcooking of the starch components in the batter. In addition, to control the moisture content, it has been found to be necessary to reduce the quantity of the chemical leavening ingredient below that normally employed. This is surprising since the excess gas would cause no problem in the vacuum environment within the container. It has been found, however, that normal amounts of leavening, produce a bubbling in the batter or dough that results in uneven texture in the cooked product. Chemical leavening agents are normally present in an amount at least 1.5% by weight of the total composition. It has been found necessary for the practice of this invention to have the leavening agent present in amounts equal to ¼ to ⅔ of that normally employed. For most applications then, the percentage of leavening agent in the composition according to this invention should range from 0.5% to 1.0% by weight. The third factor found essential to the practice of the instant invention is the sealing of the filled container under a vacuum ranging from 10 to 30 inches of mercury. This range will insure that a vacuum exists in the final product. More importantly, however, the vacuum on the uncooked contents is necessary for proper leavening of the batter or dough and in the absence of the vacuum, the mixture does not rise properly and has a poor, uneven texture and the can after cooking has an internal pressure greater than atmospheric pressure. The upper vacuum limit is a practical one being governed by the capability of rapid vacuum sealing equipment. Lower vacuum values will simply not allow the uncooked material to rise properly. It is also important that the uncooked batter or dough not occupy the entire volume of the container so that space is available for the product to rise and it is preferred that the volume occupied be no more than ⅔ of the volume of the container.

Although several embodiments and examples of the invention have been described herein, they are intended to be merely illustrative, and various modifications can be made therein without departing from the spirit and scope of the invention as defined in the following claims.

We claim:

1. A method of producing a storage-stable, chemically-leavened, bakery product within a rigid, hermetically sealed container which comprises
   (a) forming a bakery product batter wherein the total moisture content is at least 20% below the normal amount of moisture for such a batter and wherein a chemical leavening agent is present in an amount that is from about ¼ to ⅔ the normal amount of chemical leavening agent,
   (b) placing an amount of the batter in a rigid container, said amount being less than the volume of the container to allow for expansion of said batter during cooking,
   (c) drawing a vacuum of at least 10 inches of mercury on the batter filled container and hermetically sealing said filled container under said vacuum, and
   (d) heating the batter within said hermetically sealed container until said batter is cooked.

2. A method according to claim 1 wherein the chemical leavening agent is present in the batter in an amount of from 0.25% to 1.0% by weight.

3. A method according to claim 2 wherein said bakery product batter is a cake batter having a moisture content of from 10% to 20% by weight.

4. A method according to claim 3 wherein said cake batter contains 95.6% by weight of batter mix containing (a) salt (0.874%), (b) flour (28.00%), (c) eggs (14.00%), (d) sugar (41.60%), (e) shortening (14.65%) and (f) baking powder (0.876%), 4.34% water and 0.06% lemon oil.

5. A method according to claim 2 wherein said bakery product batter is a bread batter having a moisture content of about 35% by weight.

6. A method according to claim 5 wherein said bread batter contains 250 parts by weight of flour, 22 parts by weight of shortening, 22 parts by weight of sugar, 3.5 parts by weight of sodium aluminum phosphate, 3.3 parts by weight of soda, 5 parts by weight of sodium stearyl fumarate, 5 parts by weight of calcium peroxide, and 170 parts by weight of water.

References Cited
UNITED STATES PATENTS 2,997,397  8/1961  Doulgheridis _____ 99—182
3,063,846  11/1962  Polin _____ 99—182

RAYMOND N. JONES, Primary Examiner

J. R. HOFFMAN, Assistant Examiner

U.S. Cl. X.R.

99—90 NF, 92, 172